United States Patent
Klein-Hitpass

(10) Patent No.: US 10,648,542 B2
(45) Date of Patent: May 12, 2020

(54) PLANETARY GEAR WITH IMPROVED PLANET GEAR CARRIER SUPPORT

(71) Applicant: Flender GmbH, Bocholt (DE)

(72) Inventor: Arno Klein-Hitpass, Aachen (DE)

(73) Assignee: FLENDER GMBH, Bocholt (DE)

( * ) Notice: Subject to any disclaimer, the term of this patent is extended or adjusted under 35 U.S.C. 154(b) by 4 days.

(21) Appl. No.: 15/877,033

(22) Filed: Jan. 22, 2018

(65) Prior Publication Data

US 2018/0209512 A1    Jul. 26, 2018

(30) Foreign Application Priority Data

Jan. 23, 2017 (EP) ..................................... 17152660

(51) Int. Cl.
*F16H 1/46* (2006.01)
*F16H 57/08* (2006.01)
(Continued)

(52) U.S. Cl.
CPC ............... *F16H 3/64* (2013.01); *F03D 15/00* (2016.05); *F03D 15/10* (2016.05); *F16H 1/46* (2013.01);
(Continued)

(58) Field of Classification Search
CPC ........ F16H 3/64; F16H 57/023; F16H 57/021; F16H 1/46; F16H 57/082; F16H 2057/0235; F16H 37/041; F16H 57/0006; F03D 15/00; F03D 15/10; F03D 80/70; Y02E 10/722; F05B 2240/50; F05B 2260/40311
See application file for complete search history.

(56) References Cited

U.S. PATENT DOCUMENTS 3,381,546 A    5/1968 Holl
3,513,724 A    5/1970 Box
(Continued)

FOREIGN PATENT DOCUMENTS

CN    201810723 U  *  4/2011   ........... F16H 37/041
CN    201810923 U     4/2011
(Continued)

OTHER PUBLICATIONS

Klein-Hitpass et al., U.S. Pat. No. 8,621,940, Jan. 7, 2014, 2012/0067138, Mar. 22, 2012.
(Continued)

*Primary Examiner* — Jacob S. Scott
*Assistant Examiner* — Lillian T Nguyen
(74) *Attorney, Agent, or Firm* — Henry M. Feiereisen LLC

(57) ABSTRACT

A planetary gear includes a housing, a first gear stage having a first planet gear carrier, a bearing disposed on a wall of the housing, and a first shaft connected to the first planet gear carrier for torque transmission and supported in the bearing. The planetary gear further includes a second gear stage having a second planet gear carrier connected to a sun gear shaft of the first gear stage for torque transmission. The second planet gear carrier is supported in at least one of two ways, a first way in which the second planet gear carrier is supported in an axially inner bearing arranged on the first planet gear carrier, a second way in which the second planet gear carrier is supported in an axially outer bearing arranged in the wall of the housing.

13 Claims, 5 Drawing Sheets

(51) Int. Cl.
*F16H 3/64* (2006.01)
*F03D 15/00* (2016.01)
*F03D 15/10* (2016.01)
*F16H 57/021* (2012.01)
*F16H 57/023* (2012.01)

(52) U.S. Cl.
CPC ......... *F16H 57/021* (2013.01); *F16H 57/023* (2013.01); *F16H 57/082* (2013.01); *F05B 2240/50* (2013.01); *F05B 2260/40311* (2013.01); *F16H 2057/0235* (2013.01); *Y02E 10/722* (2013.01)

(56) References Cited

U.S. PATENT DOCUMENTS

| | | | |
|---|---|---|---|
| 9,413,205 B2 | 8/2016 | Dewar | |
| 9,453,572 B2 | 9/2016 | Tamai et al. | |
| 2006/0052200 A1* | 3/2006 | Flamang | F16C 35/06 475/11 |
| 2012/0051915 A1* | 3/2012 | Suzuki | F16C 33/08 416/170 R |
| 2014/0256502 A1* | 9/2014 | Bauer | F16H 1/46 475/331 |
| 2015/0023907 A1 | 1/2015 | Van Lint et al. | |
| 2015/0142175 A1 | 5/2015 | Reimers et al. | |
| 2015/0192110 A1* | 7/2015 | Pedersen | F16H 1/227 475/149 |
| 2016/0229009 A1 | 8/2016 | Klein-Hitpass et al. | |

FOREIGN PATENT DOCUMENTS

| | | |
|---|---|---|
| CN | 203272625 U | 11/2013 |
| CN | 204921896 U | 12/2015 |
| DE | 102014202621 A1 | 8/2015 |
| EP | 2284420 A1 | 2/2011 |

OTHER PUBLICATIONS

Dinter et al., U.S. Pat. No. 8,591,371, Nov. 26, 2013, 2012/0108380, May 3, 2012.
Dinter et al., U.S. Pat. No. 9,151,275, Oct. 6, 2015, 2013/0095972, Apr. 18, 2013.
Dinter et al., U.S. Pat. No. 8,632,437, Jan. 21, 2014, 2013-0088016, Apr. 11, 2013.
Dinter et al., U.S. Pat. No. 8,784,252, Jul. 22, 2014, 2013/0172141, Jul. 4, 2013.
Dinter et al., U.S. Pat. No. 8,591,368, Nov. 26, 2013, 2013-0165288, Jun. 27, 2013.
Boeing et al., U.S. Pat. No. 9,051,922, Jun. 9, 2015, 2014-0302957, Oct. 9, 2014.
Klein-Hitpass et al., U.S. Pat. No. 9,267,864, Feb. 23, 2016, 2013-0180319, Jul. 18, 2013.

* cited by examiner

PLANETARY GEAR WITH IMPROVED PLANET GEAR CARRIER SUPPORT

CROSS-REFERENCES TO RELATED APPLICATIONS

This application claims the priority of European Patent Application, Serial No. 17152660.1, filed Jan. 23, 2017, pursuant to 35 U.S.C. 119(a)-(d), the content of which is incorporated herein by reference in its entirety as if fully set forth herein.

BACKGROUND OF THE INVENTION

The present invention relates to a planetary gear which is designed, inter alia, for use in a wind energy installation. The invention also relates to a drive train for a wind energy installation, and to a wind energy installation.

The following discussion of related art is provided to assist the reader in understanding the advantages of the invention, and is not to be construed as an admission that this related art is prior art to this invention.

Conventional planetary gears disadvantageously typically have a large number of components. In addition, conventional planetary gears usually employ bearings that are complex to adjust and are cost-intensive. Accordingly, it would be desirable and advantageous to provide an improved high-performance planetary gear that can be quickly and easily installed and has a minimum of components, thus being cost effective and easy to maintain. In particular, there is a demand for a planetary gear that has a high degree of modularity.

SUMMARY OF THE INVENTION

According to one aspect of the present invention, a planetary gear has a first gear stage and a second gear stage, which are arranged directly behind one another and are mechanically coupled to one another. The planetary gear also comprises a housing, which is embodied in the manner of a differential by outer walls of the first and second gear stage and/or the respective internal gears of the first and second gear stage. The housing has an opening, through which a first shaft extends, which is directly connected to a first planet gear carrier in the first gear stage for transmission of torque. The first shaft can also be embodied in this case in one piece with the first planet gear carrier. The first shaft is accommodated rotatably in a bearing, which is attached in the area of the opening to a wall of the housing. The bearing for the first shaft is embodied so as to accept axial forces and radial forces. A rotation of the first shaft thus gives rise to a rotation of the first planet gear carrier about a common axis of rotation. The first planet gear carrier is supported on one side by this. Also accommodated in the first planet gear carrier is a first sun gear shaft, which is embodied to transmit shaft power from the first gear stage into the second gear stage. To this end the first sun gear shaft is connected in a torque-transmitting manner to a second planet gear carrier in the second gear stage. The second gear stage has at least one second planet gear and a second sun gear shaft.

In accordance with the invention, the second planet gear carrier can be accommodated rotatably in an axially inner bearing rotatable about an axis of rotation. The axially inner bearing in this case is arranged directly on the first planet gear carrier. This makes a relative rotation between the first and second planet gear carrier possible during the operation of the planetary gear. As an alternative or in addition the second planet gear carrier is accommodated in an axially outer bearing, which is accommodated at an opposite end of the housing, in its wall, to the first planet gear carrier. The axially inner bearing and/or the axially outer bearing in this case are preferably embodied primarily to accept an axial load. By this it is to be understood that the load able to be imposed on the axially inner or axially outer bearings in the axial direction significantly exceeds the load able to be imposed on them in the radial direction.

The support of the first and second gear stages in accordance with the present invention allows a good automatic centering of the planet gear carrier, of the associated planet gears and of the respective sun gear shaft with a minimum of bearings employed. In particular a precise and loadable support of the two planet gear carriers can already be achieved with two bearings. The support of the planet gear carrier also gives the inventive planetary gear the option of essentially embodying the planetary gear in a modular manner. This enables the gear stages to be manufactured separately and allows a simple final installation of the claimed planetary gear. When used in a wind energy installation, the inventive planetary gear is able to be transported separated into its first and second gear stage and just installed in a simple way and at the site where it is to be used. In this way a high degree of flexibility during final installation of the inventive planetary gear and of the associated applications is achieved.

According to another advantageous feature of the present invention, the bearing in which the first shaft is accommodated can be the axially inner bearing and/or the axially outer bearing, embodied in each case as a plain bearing or as a roller bearing. Advantageously, the roller bearing may be constructed as a ball roller bearing, self-aligning roller bearing, barrel roller bearing, cross roller bearing, as a needle roller bearing, as a cylinder roller bearing, deep-groove ball bearing, angular contact ball bearing, four-point bearing, ball roller bearing, axial-radial cylinder roller bearing, axial groove ball bearing, axial angular contact ball bearing, axial cylinder roller bearing or as a combination of these bearings. These types of bearing offer a high level of load-bearing capacity against axial and radial stresses and a high level of reliability. Advantageously, the plain bearing may be constructed as a radial bearing, in particular as a circular cylindrical bearing, multi-surface bearing with tilting segments, as a double wedge bearing, also called a lemon-bore bearing, as a multi-surface plain bearing or as a floating-bush bearing. Further preferred is a plain bearing that is embodied as an axial bearing, especially as a bearing with embedded wedge surfaces or as a bearing with tiltable bearing segments. When plain bearings are used a high level of reliability and low maintenance costs can be achieved. The inventive solution thus provides especially simple types of bearing.

According to another advantageous feature of the present invention, the bearing of the first shaft, the axially inner bearing and/or the axially outer bearing may each be embodied as ball roller bearings. In this case at least one of the ball roller bearings may be pre-tensioned in a pre-installed state of the first and/or second gear stage. A pre-installed state is to be understood as a state in which the first and/or the second gear stage are already installed separately in each case, but are still to be joined together to form the desired planetary gear.

In accordance with the present invention, the ball roller bearings in the first and/or second gear stage can be separately pre-tensioned and thus adjusted. The first and second gear stage can thus be installed in a modular fashion and combined in a simple way, without further adjustment of the ball roller bearings, to form the inventive planetary gear. This means that there is no need for a complex adjustment of the ball roller bearings during the final installation of the planetary gear, as in the prior art, so that the manufacturing of the claimed planetary gear is simplified.

According to another advantageous feature of the present invention, the first and/or second gear stage of the planetary gear may further be embodied in each case as a transmission stage. A transmission stage in this case is to be understood as a gear stage in which the output rpm is higher than the input rpm. In the first gear stage here the first shaft serves as a drive shaft, and in the second gear stage the first sun gear shaft serves as the drive shaft. In a design of this type of the inventive planetary gear the technical advantages sketched out above are achieved to an especially great extent. As an alternative or in addition, in the inventive planetary gear, the first and/or second gear stage can also be embodied as reduction stages in each case. A reduction stage in this case is to be understood as a gear stage in which the output rpm is lower than the input rpm.

According to another advantageous feature of the present invention, in the installed state of the planetary gear according to the present invention, an essentially ring-shaped space can be formed between the first and second planet gear carriers. The housing, which surrounds the space, can hereby be constructed to be free from a bearing support in the area of the ring-shaped space. This essentially allows the first and second gear stage to be embodied essentially open at their axially inner end. There is consequently no need for a split housing cross section, which is embodied to accommodate a bearing in the space between the first and second planet gear carrier. Therefore, the production of the housing is simplified and more cost-effective. The first and/or second gear stage, through its open-on-one-side design, is easily accessible and thus easy to maintain. The modularity of the claimed planetary gear is hence also further enhanced.

According to another advantageous feature of the present invention, the housing may be constructed so that it can be dismantled in the area of the space between the first and second planet gear carriers. To this end the housing can be equipped in the area of the unobstructed space with a releasable connecting element, for example a flange. The connecting elements on the walls of the housing of the first and/or second gear stage may in this case advantageously be connected to one another via connecting means, such as bolts or screws for example. The modularity of the inventive planetary gear is further enhanced by the connecting elements on the walls of the housing to the respective gear stages. As an alternative or in addition, the first and second gear stage may also be mounted on one another using a pin connection.

According to another advantageous feature of the present invention, a thrust bearing may be arranged between the first planet gear carrier and the housing. When the first planet gear carrier is aligned according to specification, the thrust bearing and the first planet gear carrier are not in contact. The thrust bearing prevents a disproportionate radial deflection of the first planet gear carrier so that the starting up of the planetary gear always takes place at a maximum acceptable oblique position of the first planet gear carrier.

According to another advantageous feature of the present invention, a stub tooth section may be arranged between the first sun gear shaft and the second planet gear carrier, which guarantees that torque is transmitted from the first sun gear shaft to the second planet gear carrier.

According to another aspect of the present invention, a drive train for a wind energy installation includes a first and optionally a second rotor shaft main bearing and a rotor shaft, which is connected for the transmission of torque to a generator, and the generator itself. The torque-transmission coupling between the rotor shaft and the generator is made via a planetary gear. In accordance with the invention, the planetary gear is constructed in accordance with the afore-described embodiments.

According to yet another aspect of the present invention, a wind energy installation includes a rotor, which is connected to a rotor shaft and is fastened to a nacelle. The rotor is hereby connected to the afore-described drive train for transmission of torque.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
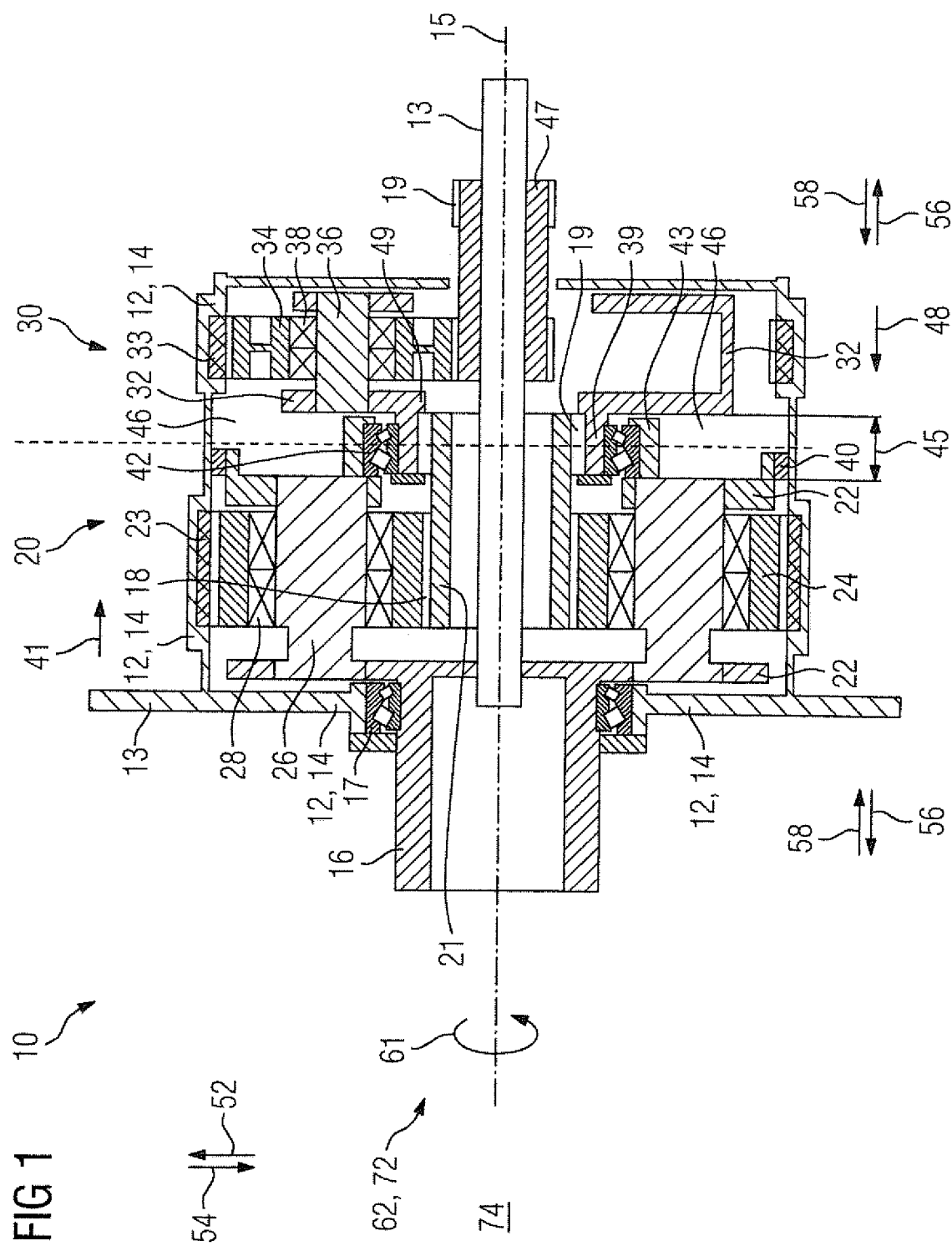
FIG. 1 shows in cross-section a first exemplary embodiment of the planetary gear according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in cross section a schematic diagram of a first exemplary embodiment of the inventive planetary gear 10. The planetary gear 10 has a first gear stage 20 and a second gear stage 30, which each have a first internal gear 23 or a second internal gear 33. First planet gears 24 are accommodated in the first internal gear 23 of the first planetary stage 20, which in their turn are each supported rotatably on first planet gear carriers 28 on a first planet gear shaft 26. In this case the first planet gears 24 and their planet gear shafts 26 are accommodated in a first planet gear carrier 22, which is rotatable around an axis of rotation 15 of the planetary gear 10. The first planet gear carrier 22 is embodied in one piece with a first shaft 16, which is accommodated rotatably in a bearing 17. The first planet gear carrier 22 is supported on one side by this. The bearing 17 in which the first shaft 16 is accommodated is attached to one wall 14 of a housing 12 of the planetary gear 10 and is embodied to accommodate radial stresses and axial stresses. The housing 12 of the planetary gear 10 is embodied in the form of a differential and comprises walls 14 of the first and second gear stage 20, 30 as well as the associated internal gears 23, 33. The first gear stage 20 has torque supports 13 for connection with a nacelle 74 not shown in any greater detail. The first shaft 16 serves in this case as a drive shaft and is connected to a rotor shaft 62 not shown in any greater detail, which is driven by a rotor 72 not shown in any greater detail. A drive power 61, which reaches a first sun gear shaft 21 via the first planet gear carrier 22 and the first planet gears 24, is transmitted via the rotor shaft 62 to the first shaft 16, which is essentially accommodated centrally in the planetary gear 10.

The first sun gear shaft 21 is rotatable in this case about the axis of rotation 15 of the planetary gear 10. A helical gear section 18 is embodied between the first sun gear shaft 21 and the first planet gears 24, through which, during operation of the planetary gear 10, an axial force 41 is exerted in the direction of the second planet gear carrier. In this case the axial force 41 is directed axially inwards. An axially outer direction is shown in FIG. 1 by the arrows with the reference character 56. Accordingly an axially inner direction is indicated by arrows with the reference character 58. Furthermore a thrust bearing 40 is arranged on the wall 14 of the housing 12, which lies opposite the first planet gear carrier 22 in a radial direction. The radial direction is related in FIG. 1 to the axis of rotation 15. A radially outer direction in this case is shown by the arrow with the reference character 52, a radially inner direction is indicated by the arrow with the reference character 54.

The first planet gear carrier 22, at an axially inner end, has a bearing projection 43, in which an axially inner bearing 42 is accommodated. In this case the axially inner bearing 42 is embodied as a two-row ball roller bearing. Accommodated in its turn in the axially inner bearing 42 is an axial extension 39, which embodied in one piece with the second planet gear carrier 32. In the second planet gear carrier 32 a second planet gear 34 is accommodated rotatably on a second planet gear bearing 38 on a second planet gear shaft 36. The second planet gear carrier is thus supported directly at an axially inner end via the axially inner bearing 42 on the first planet gear carrier 22. The drive power 61 transmitted from the first sun gear shaft 21 reaches a second sun gear shaft 47 in the second gear stage 30 via the second planet gear carder 32 and the second planet gear 35. To transmit the torque from the first sun gear shaft 21 to the second planet gear carrier 32 a stub tooth section 19 is embodied between these. Through the support of the second planet gear carrier 32 in the first planet gear carrier 22 an essentially ring-shaped space 46 is produced between them. The ring-shaped space in this case is essentially delimited by the walls 14 of the housing 12, the bearing projection 43 and the planet gear carriers 22, 32. In an area 45 of the space 46 the housing 12 is free of a branched cross section, which extends inwards. As a result the space 46 is essentially embodied as an unobstructed space.

Figure 2:
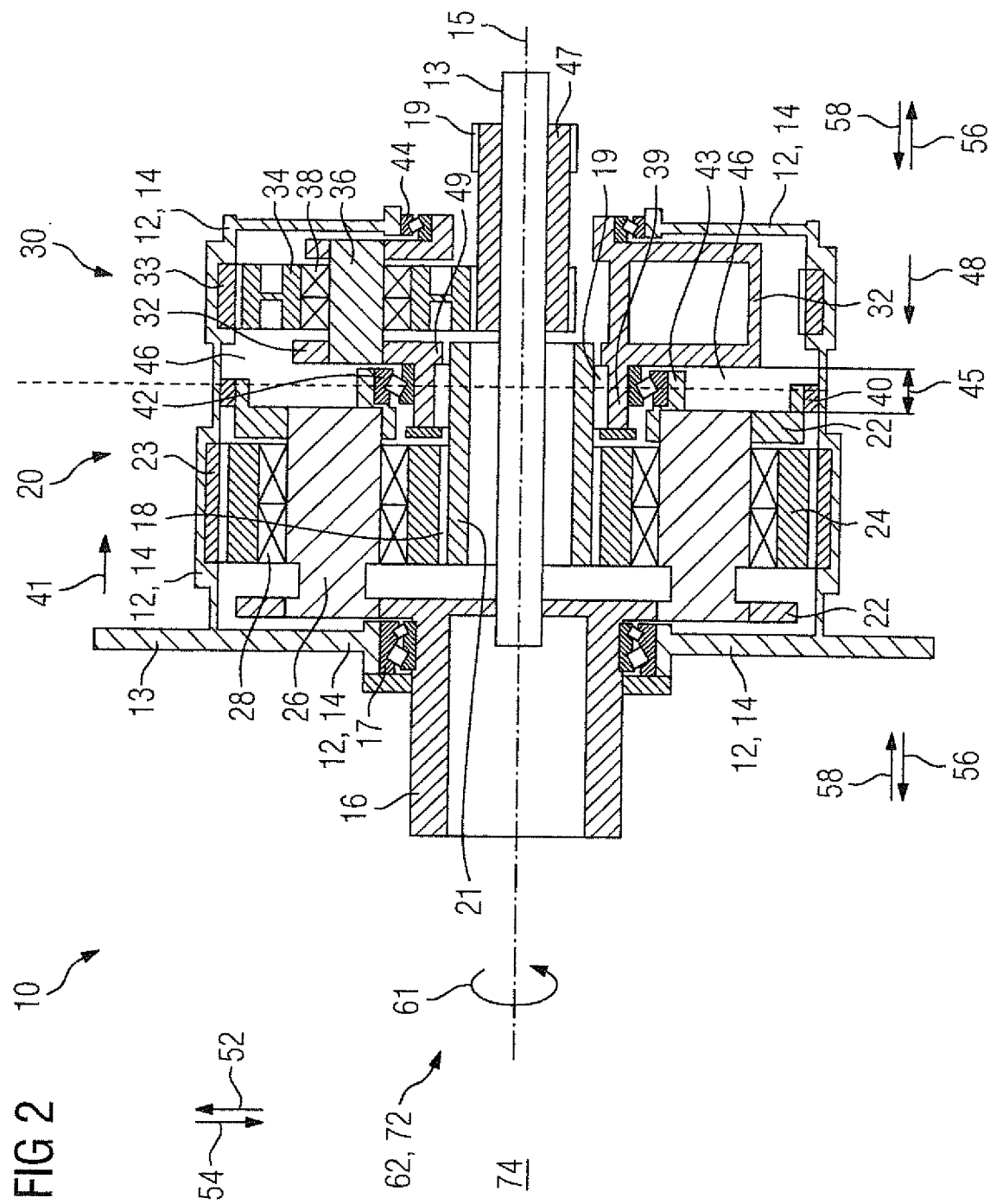
FIG. 2 shows in cross-section a second exemplary embodiment of the planetary gear according to the present invention.

FIG. 2 shows a schematic of the cross section of a second exemplary embodiment of the inventive planetary gear 10. The planetary gear 10 has a first gear stage 20 and a second gear stage 30, which each have a first internal gear 23 or a second internal gear 33. First planet gears 24, which in turn are each rotatably supported in first planet gear bearings 28 on a first planet gear shaft 26, are accommodated in the first internal gear 23 of the first planet gear stage 20. In this case the first planet gears 24 and their planet gear shafts 26 are accommodated on a first planet gear carrier 22, which is able to be rotated about an axis of rotation 15 of the planetary gear 10. The first planet gear carrier 22 is embodied in one piece with a first shaft 16, which is accommodated rotatably in a bearing 17. The first planet gear carrier 22 is supported on one side by this. The bearing 17, in which the first shaft 16 is accommodated, is attached to a wall 14 of a housing 12 of the planetary gear 10 and is embodied to accept radial stresses and axial stresses. The housing 12 of the planetary gear 10 is embodied in the manner of a differential and comprises walls 14 of the first and second gear stage 20, 30 as well as the associated internal gears 23, 33. The first gear stage 20 has torque supports 13 for connection to a gondola 74 not shown in any greater detail. The first shaft 16 serves in this case as a drive shaft and is connected to a rotor shaft 62 not shown in any greater detail, which is driven by a rotor 72 not shown in any greater detail. A drive power 61 is transmitted via the rotor shaft 62 to the first shaft 16, which reaches a first sun gear shaft 21, which is essentially accommodated centrally in the planetary gear 10, via the first planet gear carrier 22 and the first planet gears 24.

In this case the first sun gear shaft 21 is rotatable about the axis of rotation 15 of the planetary gear 10. A helical gear section 18 is embodied between the first sun gear shaft 21 and the first planet gears 24, through which, during operation of the planetary gear 10, an axial force 41 is exerted in the direction of the second planet gear carrier. In this case the axial force 41 is directed axially inwards. An axially outer direction is shown in FIG. 2 by the arrows with the reference character 56. Accordingly an axially inner direction is indicated by arrows with the reference character 58. Furthermore a thrust bearing 40, which lies opposite the first planet gear carrier 22 in a radial direction, is arranged on the wall 14 of the housing 12. The radial direction is related in FIG. 2 to the axis of rotation 15. A radially outer direction in this case is shown by the arrow with the reference character 52, a radially inner direction is indicated by the arrow with the reference character 54.

The first planet gear carrier 22 has a bearing projection 43 at an axial inner end, in which an axially inner bearing 42 is accommodated. In this case the axially inner bearing 42 is embodied as a two-row ball roller bearing. Accommodated in the axially inner bearing 42 in its turn is an axial extension 39, which is embodied in one piece with the second planet gear carrier 32. Accommodated in the second planet gear carrier 32 is a second planet gear 34 on a second planet gear bearing 38 rotatably on a second planet gear shaft 36. The second planet gear carrier is thus supported directly at an axially inner end via the axially inner bearing 42 on the first planet gear carrier 22. Above and beyond this the second planet gear carrier 32 is accommodated rotatably on a side facing away from the first planet gear carrier 22 in an axially outer bearing 44. The second planet gear carrier 32 is consequently supported on both sides and achieves a high degree of alignment accuracy. Further radial loads, which act on the second planet gear carrier, are essentially distributed evenly to the axially inner bearing 42 and the axially outer bearing 44. Accordingly the axially inner and the axially outer bearing 42, 44 are dimensioned smaller.

In the second gear stage 30 the drive power 61 transmitted by the first sun gear shaft 21 reaches a second sun gear shaft 47 via the second planet gear carrier 32 and the second planet gear 35. To transmit the torque from the first sun gear shaft 21 to the second planet gear carrier 32 a stub tooth section 19 is embodied between these two. Through the support of the second planet gear carrier 32 in the first planet gear carrier 22 an essentially ring-shaped space 46 is produced between them. The ring-shaped space in this case is essentially delimited by the wall 14 of the housing 12, the bearing projection 43 and the planet gear carriers 22, 32. In an area 45 of the space 46 the housing 12 is free from a branched cross section, which extends inwards. As a result the space 46 is essentially embodied as an unobstructed space.

Figure 3:
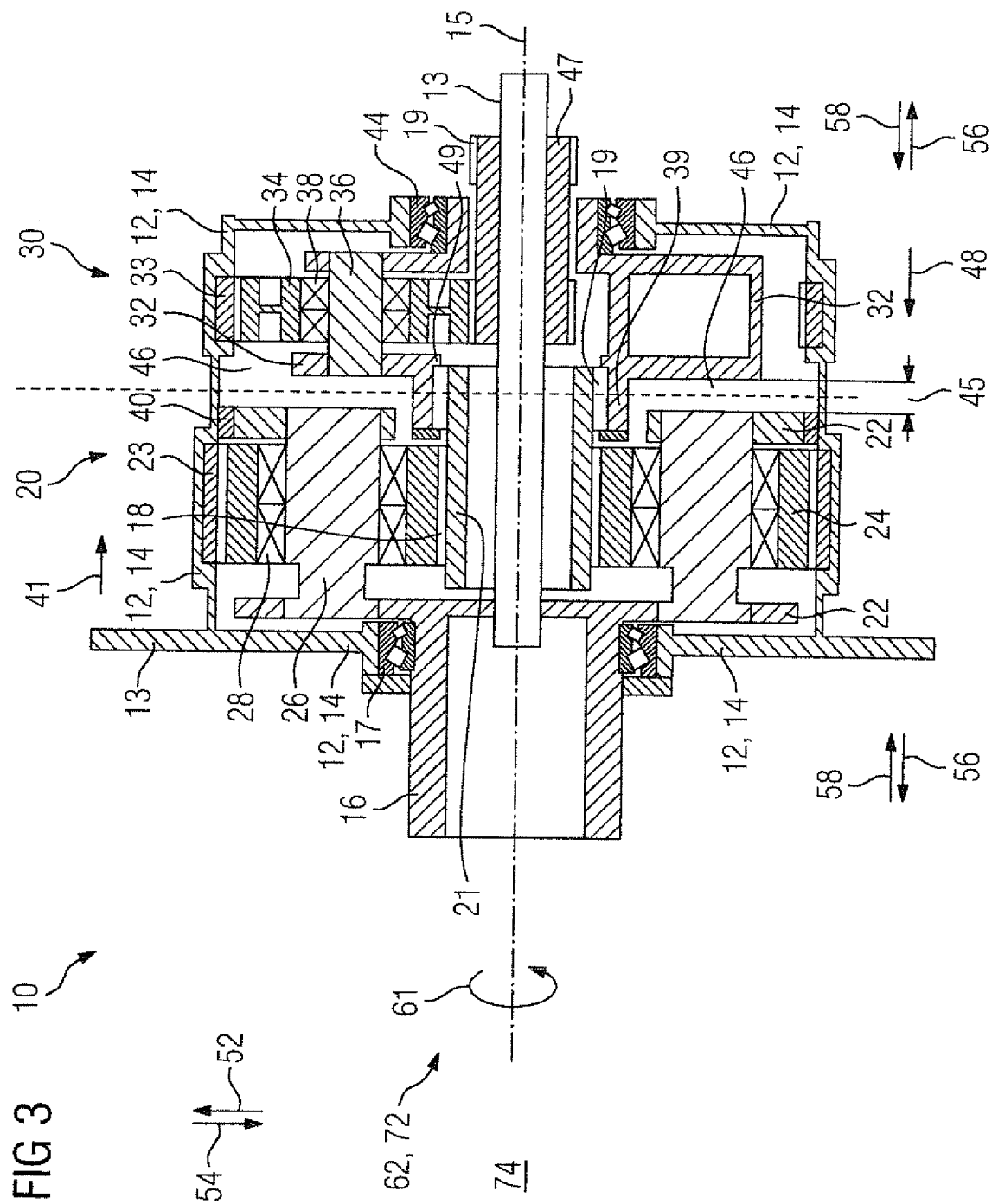
FIG. 3 shows in cross-section a third exemplary embodiment of the planetary gear according to the present invention.

FIG. 3 shows a schematic of the cross section of a third exemplary embodiment of the inventive planetary gear 10. The planetary gear 10 has a first gear stage 20 and a second gear stage 30, which each have a first internal gear 23 or a second internal gear 33. First planet gears 24, which in their turn in each case are supported rotatably in first planet gear bearings 28 on a first planet gear shaft 26, are accommodated in the first internal gear 23 of the first planetary stage 20. In this case the first planet gears 24 and their planet gear shafts 26 are accommodated in a first planet gear carrier 22, which is rotatable about an axis of rotation 15 of the planetary gear 10. The first planet gear carrier 22 is embodied in one piece with a first shaft 16, which is accommodated rotatably in a bearing 17. The first planet gear carrier 22 is supported on one side by this. The bearing 17 in which the first shaft 16 is accommodated, is attached to one wall 14 of a housing 12 of the planetary gear 10 and is embodied to accommodate radial stresses and axial stresses. The housing 12 of the planetary gear 10 is embodied in the manner of a differential and comprises walls 14 of the first and second gear stage 20, 30 as well as the associated internal gears 23, 33. The first gear stage 20 has torque supports 13 for connection with a gondola 74 not shown in any greater detail. The first shaft 16 serves in this case as a drive shaft and is connected to a rotor shaft 62 not shown in any greater detail, which is driven by a rotor 72 not shown in any greater detail. A drive power 61, which reaches a first sun gear shaft 21 via the first planet gear carrier 22 and the first planet gears 24, is transmitted via the rotor shaft 62 to the first shaft 16, which is essentially accommodated centrally in the planetary gear 10.

In this case the first sun gear shaft 21 is rotatable about the axis of rotation 15 of the planetary gear 10. A helical gear section 18 is embodied between the first sun gear shaft 21 and the first planet gears 24, through which, during operation of the planetary gear 10, an axial force 41 is exerted in the direction of the second planet gear carrier. In this case the axial force 41 is directed axially inwards. An axially outer direction is shown in FIG. 3 by the arrows with the reference character 56. Accordingly an axially inner direction is indicated by arrows with the reference character 58. Furthermore a thrust bearing 40, which lies opposite the first planet gear carrier 22 in a radial direction, is arranged on the wall 14 of the housing 12. The radial direction is related in FIG. 3 to the axis of rotation 15. A radially outer direction in this case is shown by the arrow with the reference character 52, a radially inner direction is indicated by the arrow with the reference character 54.

Above and beyond this the second planet gear carrier 32 is accommodated rotatably in an axially outer bearing 44 on a side facing away from the first planet gear carrier 22. The second planet gear carrier 32 is consequently supported on one side, so that the planetary gear 10 makes do with a minimum of components. Through the support on one side of the first and second planet gear carrier 22, 32, in an axially inner area, in which the stub tooth section 19 on the first sun gear shaft 21 engages into the second planet gear carrier 32, a maximum play in the radial direction is achieved. Through this the alignment precision required for the assembly of the first and second gear stage 20, 30 is reduced and thus the installation of the planetary gear 10 simplified.

The drive power 61 transmitted from the first sun gear shaft 21 reaches a second sun gear shaft 47 in the second gear stage 30 via the second planet gear carrier 32 and the second planet gear 35. To transmit the torque from the first sun gear shaft 21 to the second planet gear carrier 32, a stub tooth section 19 is embodied between them. Through the support of the second planet gear carrier 32 in the first planet gear carrier 22 an essentially ring-shaped space 46 is produced between them. The ring-shaped space in this case is essentially delimited by the walls 14 of the housing 12, the bearing projection 43 and the planet gear carriers 22, 32. In an area 45 of the space 46 the housing 12 is free from a branched cross section, which extends inwards. As a result the space 46 is essentially embodied as an unobstructed space.

Figure 4:
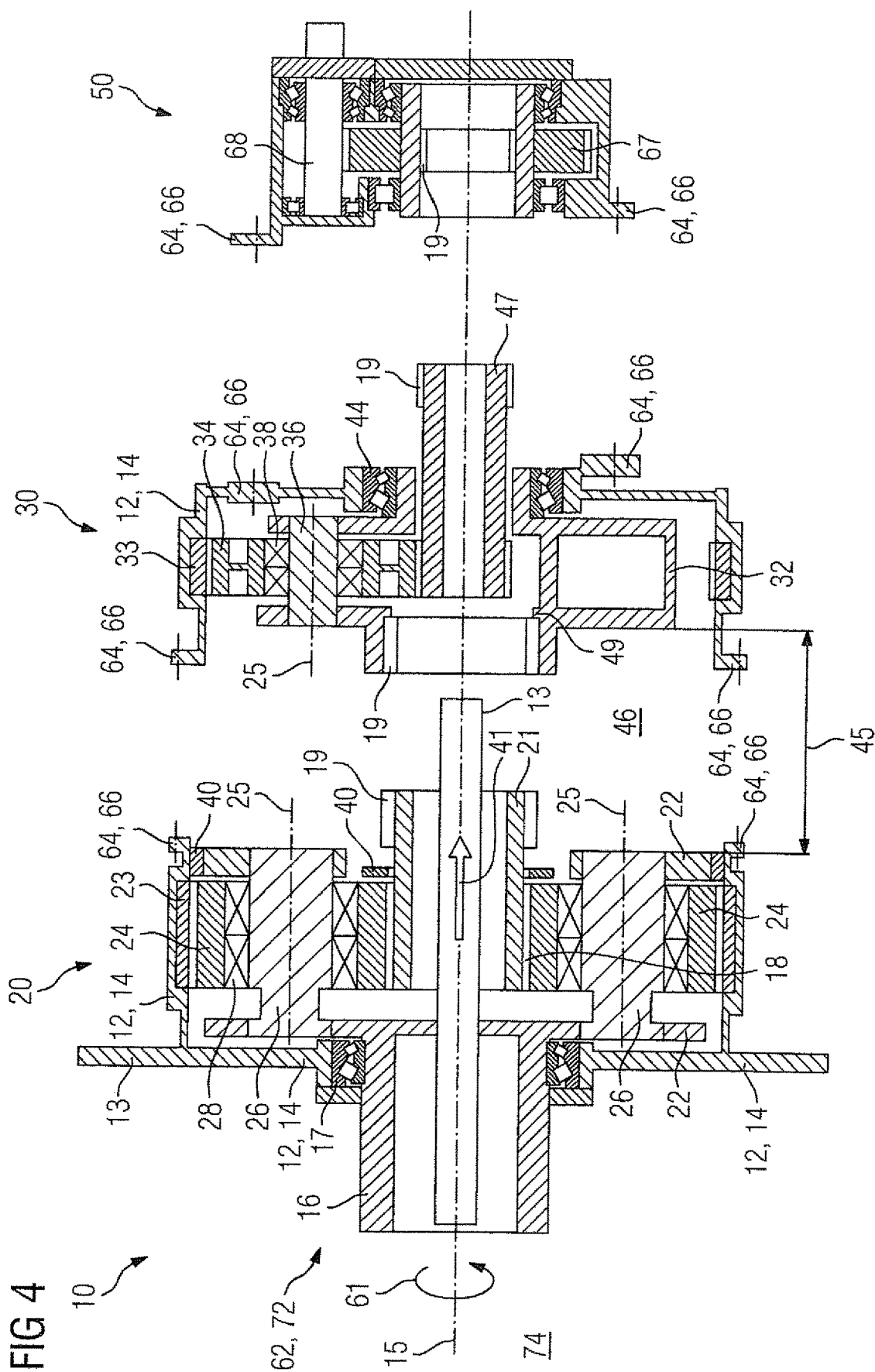
FIG. 4 shows in cross-section a fourth exemplary embodiment of the planetary gear according to the present invention.

FIG. 4 shows an installation of a fourth exemplary embodiment of the inventive planetary gear 10. The planetary gear 10 comprises a first gear stage 20, which is accommodated in a housing 12. An opening is provided in a wall 14 of the housing 12, through which a first shaft 16 extends, which is accommodated in a bearing 17. The bearing 17 in this case is fastened to the wall 14 of the housing 12 and is separately pre-tensioned, i.e. adjusted, in the pre-installed state of the first gear stage 20. The bearing 17 is further embodied to accept radial loads and axial loads. The housing 12 of the planetary gear 10 is embodied in the manner of a differential and comprises walls 14 of the first and second gear stage 20, 30 as well as the associated internal gears 23, 33. The first gear stage 20 has torque supports 13 for connection to a nacelle 74 not shown in any greater detail.

The first shaft 16 is coupled to a rotor shaft 62 not shown in any greater detail, which forms the drive side for the planetary gear 10. The rotor shaft 62 is coupled in this case to a rotor 72 not shown in any greater detail. A first planet gear carrier 22 is embodied in one piece with the first shaft 16, so that a drive power 61 transported via the first shaft 16 gives rise to a rotation of the first planet gear carrier 22 about a common axis of rotation 15. Accommodated in the first planet gear carrier 22 are a number of first planet gears 24, which in their turn are supported with first planet gear bearings 28 on first planet gear shafts 26. The first planet gears 24 are each rotatable about a planet gear shaft 25. The first planet gears 24 engage in teeth on a first internal gear 23, which is connected to the wall 14 of the housing 12. A first sun gear shaft 21 is accommodated centrally in the first planet gear 22. There is helical gear 18 present between the first sun gear shaft 21 and the first planet gears 24, which during the operation of the first gear stage 20, exerts an axial force 41 in the direction of a second planet gear carrier 32 on the first sun gear shaft 21. The first sun gear shaft 21 is provided with a stub tooth section 19 on an end facing away from the first planet gear carrier 22, which in the installed state of the planetary gear 10 allows a transmission of shaft force to the second planet gear 32. A thrust bearing 40, which is embodied to delimit a radial deflection of the first planet gear carrier 22, is further arranged on the wail 14 of the housing 12.

The housing 12 of the first gear stage 20 is essentially embodied open at an end facing towards the second gear stage 30. At the edge of the housing 12, which faces towards the second gear stage 30, the wall 14 is provided with a fastening element 64, which is embodied as a flange. The fastening element 64 is embodied to interact with a fastening means 66, which is embodied as a bolt. The wall 14 of the housing 12 of the second gear stage 30 also has a connection element 64 corresponding to the connection element 64 on the housing 12 of the first gear stage 20. The connection element 64 on the second gear stage 30 is embodied to interact with the fastening means 66, so that the first gear stage 20 is able to be fastened detachably to the second gear stage 30. The housing 12 of the second gear stage 30 is also embodied essentially open on the side facing towards the first gear stage 20. When the first and second gear stages 20, 30 are joined together, a space 46 lying between them is reduced and is closed when the housing 12 is connected to the connecting elements 64. The space 46 in this case is essentially embodied in the shape of a ring. The open-on-one side design of the housing 12 of the individual gear stages 20, 30 allows the space 46 in an area 45, which essentially extends between the end face sides of the planet gear carriers 22, 32 facing towards each other, as an unobstructed space. In this area 45 the housing 12 on the first and second gear stage 20, 30 is free from bearing receptacles for the planet gears 22, 32.

When the first and second gear stage 20, 30 are joined together a torque-transmission connection is established via the stub tooth section 19, which is embodied between the first sun gear shaft 21 and on the essentially central circumferential projection 49 on the second planet gear carrier 32. A planet gear 34 is supported in the second planet gear carrier 32, which is supported via a second planet gear bearing 38 on a second planet gear shaft 36. The second planet gear 34 in this case is rotatable about a planet gear shaft 25. The second planet gear 34 engages with a second internal gear 33, which is connected to the wall 14 of the housing 12. The second planet gear 34 is further coupled to a second sun gear shaft 47, so that during operation shaft power is transmitted from the first sun gear shaft 21 via the second planet gear carrier 32, the second planet gear 34 and the second internal gear 33 to the second sun gear shaft 47. The second planet gear carrier 32 in this case is accommodated rotatably in an axially outer bearing 44. The axially outer bearing 44 in this case is fastened to the wall 14 of the housing 12 of the second gear stage 30. Through this a one-side support of the second planet gear carrier 32 is achieved, through the second planet gear carrier 32 when it is joined to the first gear stage 20 in area 45 of the space 46 in the radial direction has a high installation play. Equally the first planet gear carrier 22 has a maximum installation play in the area 45 of the space 46, so that installation is made significantly easier. In the assembled state, through spreading forces in the first and second planet gears 24, 34 during operation of the planetary gear 10, an automatic centering of the planet gear carrier 22, 32 is produced.

The housing 12 of the second gear stage 20 also has at least one connection element 64 on a side facing away from the first gear stage 20, which allows a detachable connection with a corresponding connection element 64 on a third gear stage 50. To this end the connection elements 64 on the second and third gear stage 30, 50 interact with a connection means 66. The shaft power is transmitted from the second gear stage 30 to the third gear stage 50 via a stub tooth section 19, which is embodied on an end of the second sun gear shaft 47 facing away from the second planet gear carrier 32. The stub tooth section 19 on the second sun gear shaft 47 engages in a stub tooth section 19 on a spur gear 67 in the third gear stage 50, which interacts with a tooth section not shown in any greater detail with a take-off shaft 68.

Figure 5:
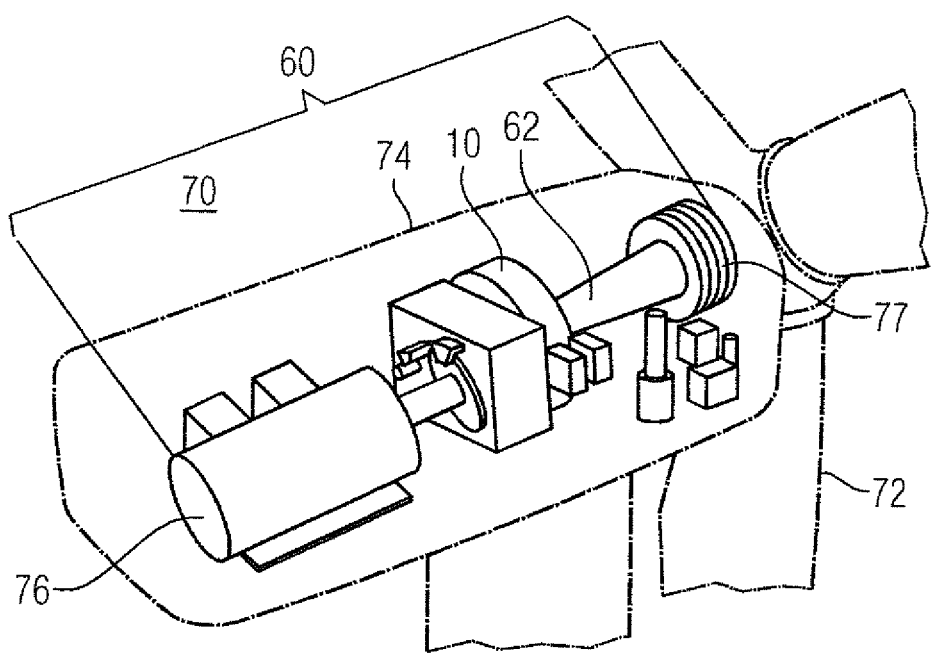
FIG. 5 shows an exemplary embodiment of a wind energy installation with an inventive drive train according to the present invention.

FIG. 5 shows a schematic of the structure of an inventive wind power installation 70, which has a nacelle 74, to which a rotor 72 is attached. The rotor 72 is connected for torque transmission via a rotor shaft 62 to a planetary gear 10. The rotor shaft 62 belongs together with the planetary gear 10, a generator 76 and a main rotor shaft bearing 77 to a drive train 60 of the wind energy installation 70. The planetary gear 10 in turn is connected for torque transmission to a generator 76, via which electricity is obtained.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A planetary gear, comprising:
a housing;
a first gear stage comprising a first planet gear carrier, a first bearing disposed on a wall of the housing, and a first shaft connected to the first planet gear carrier for torque transmission and supported in the first bearing;
a second gear stage comprising a second planet gear carrier connected to a sun gear shaft of the first gear stage for torque transmission, said second planet gear carrier being supported in at least one of two ways, a first way in which the second planet gear carrier is supported in an axially inner second bearing arranged on the first planet gear carrier, a second way in which the second planet gear carrier is supported in an axially outer third bearing arranged in the wall of the housing; and
a stub tooth section formed between the sun gear shaft and the second planet gear carrier.

2. The planetary gear of claim 1, wherein at least one member selected from the group consisting of the first bearing, in which the first shaft is supported, the axially inner second bearing, and the axially outer third bearing is constructed as a roller bearing or as a plain bearing.

3. The planetary gear of claim 2, wherein the first bearing for support of the first shaft is constructed as a ball roller bearing and is pre-tensioned in a pre-installed state of the first gear stage.

4. The planetary gear of claim 2, wherein the axially outer third bearing is pre-tensioned in a pre-installed state of the second gear stage.

5. The planetary gear of claim 1, wherein at least one member selected from the group consisting of the first bearing, in which the first shaft is supported, the axially inner second bearing, and the axially outer third bearing is constructed as a radial bearing or as an axial bearing.

6. The planetary gear of claim 1, wherein the first shaft is constructed as a drive shaft.

7. The planetary gear of claim 1, wherein at least one member selected from the group consisting of the first gear stage and the second gear stage is constructed as a transmission stage.

8. The planetary gear of claim 1, wherein the first planet gear carrier and the second planet gear carrier define there between a space, with the housing being configured in the absence of a bearing receptacle in an area of the space.

9. The planetary gear of claim 8, wherein the housing is configured to enable dismantling thereof in the area of the space.

10. The planetary gear of claim 1, further comprising a thrust bearing arranged between the first planet gear carrier and the housing.

11. The planetary gear of claim 1, wherein each of the first planet gear carrier and the second planet gear carrier includes a planet gear bearing, the planet gear bearing of at least one of the first and second planet gear carriers being constructed as a plain bearing.

12. A drive train for a wind energy installation, comprising
- a rotor shaft;
- a generator; and
- a planetary gear connecting the rotor shaft with the generator for transmission of torque, said planetary gear comprising a housing, a first gear stage comprising a first planet gear carrier, a first bearing disposed on a wall of the housing, and a first shaft connected to the first planet gear carrier for torque transmission and supported in the first bearing, a second gear stage comprising a second planet gear carrier connected to a sun gear shaft of the first gear stage for torque transmission, said second planet gear carrier being supported in at least one of two ways, a first way in which the second planet gear carrier is supported in an axially inner second bearing arranged on the first planet gear carrier, a second way in which the second planet gear carrier is supported in an axially outer third bearing arranged in the wail of the housing, and a stub tooth section formed between the sun gear shaft and the second planet gear carrier.

13. A wind energy installation, comprising
- a nacelle;
- a rotor fastened to the nacelle; and
- a drive train comprising a generator, a planetary gear, and a rotor shaft connecting the rotor to the planetary gear, said planetary gear connecting the rotor shaft with the generator for transmission of torque, said planetary gear comprising a housing, a first gear stage comprising a first planet gear carrier, a first bearing disposed on a wall of the housing, and a first shaft connected to the first planet gear carrier for torque transmission and supported in the first bearing, and a second gear stage comprising a second planet gear carrier connected to a sun gear shaft of the first gear stage for torque transmission, said second planet gear carrier being supported in at least one of two ways, a first way in which the second planet gear carrier is supported in an axially inner second bearing arranged on the first planet gear carrier, a second way in which the second planet gear carrier is supported in an axially outer third bearing arranged in the wall of the housing, and a stub tooth section formed between the sun gear shaft and the second planet gear carrier.

* * * * *